UNITED STATES PATENT OFFICE.

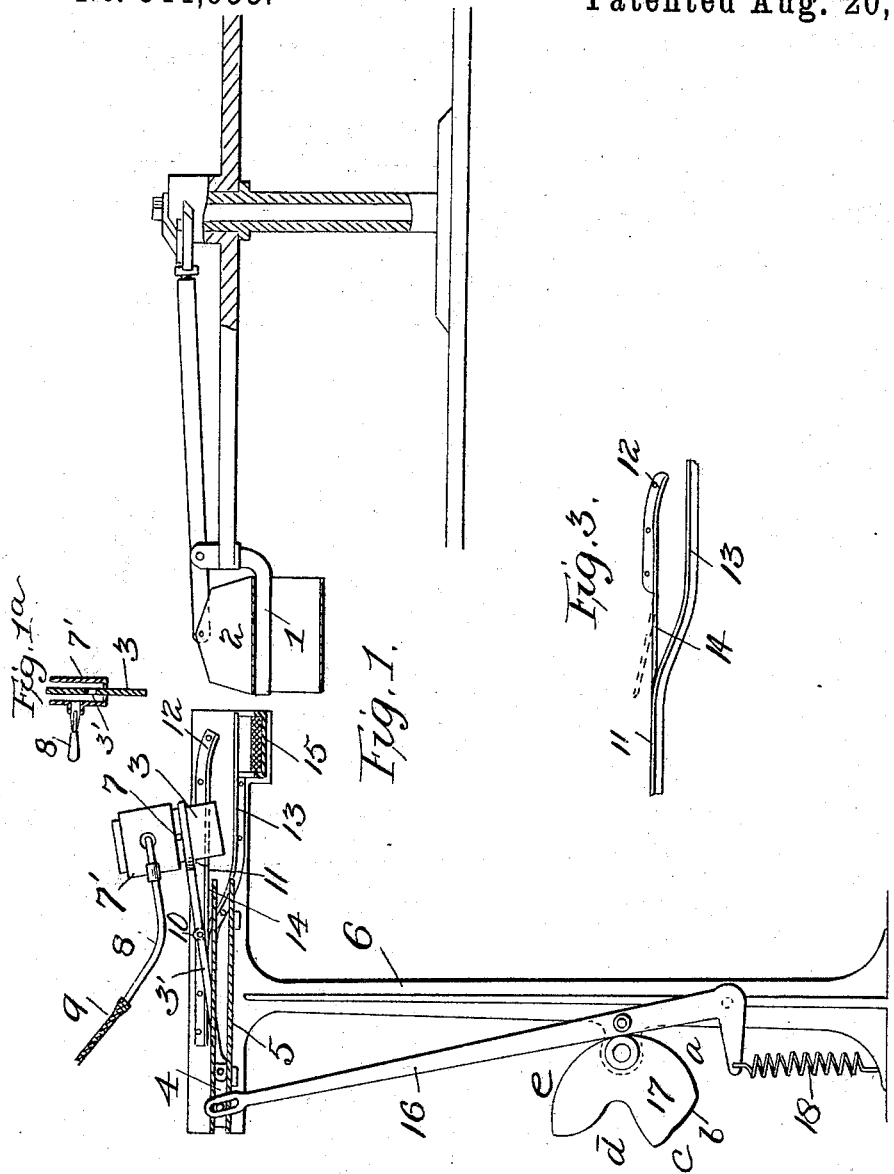

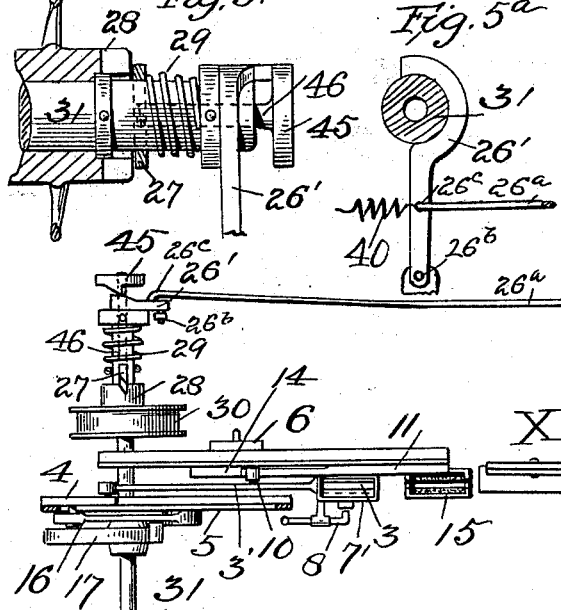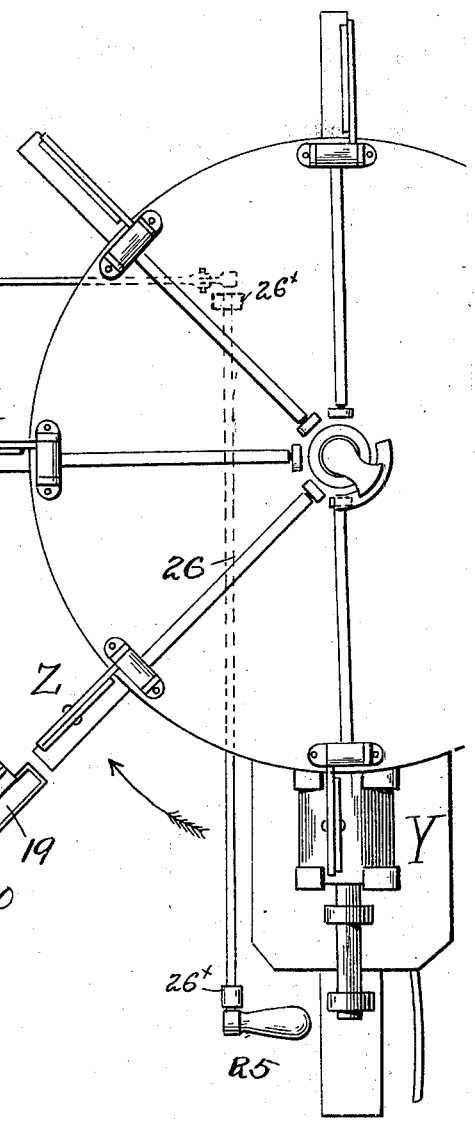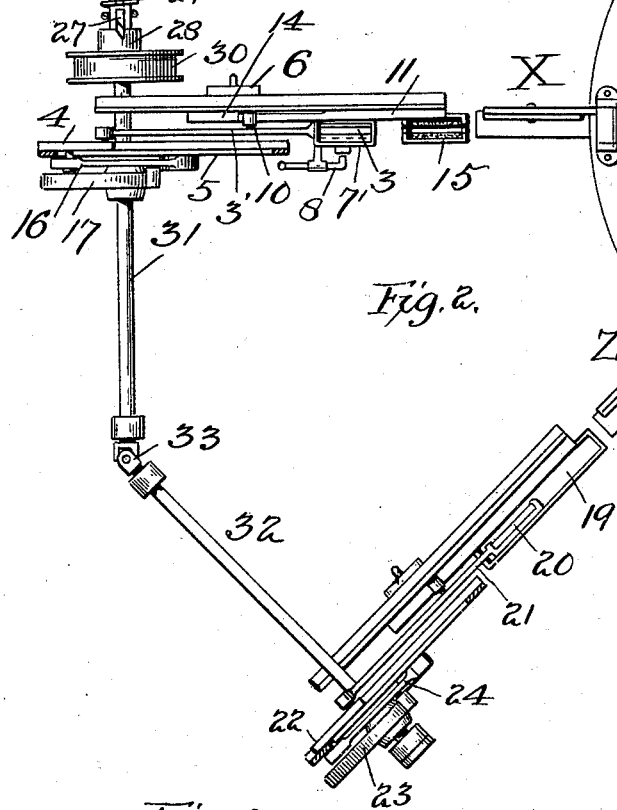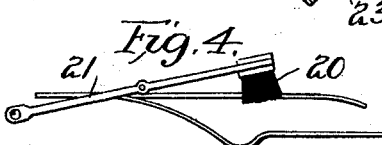

WILLIAM DYER BROOKS, OF BALTIMORE, MARYLAND.

CAN-SOLDERING APPARATUS.

SPECIFICATION forming part of Letters Patent No. 544,953, dated August 20, 1895.

Application filed March 16, 1895. Serial No. 542,040. (No model.)

*To all whom it may concern:*

Be it known that I, WILLIAM DYER BROOKS, a citizen of the United States, residing at Baltimore, in the State of Maryland, have invented certain new and useful Improvements in Can-Soldering Apparatus, of which the following is a specification, reference being had therein to the accompanying drawings.

My invention is designed to provide means for automatically soldering the side seams of cans, and is intended to do the work which heretofore has been generally done by hand.

My object is to so construct such a device as will be adapted to any form of machine in which the can-body is held on a horn or support ready to be soldered.

My invention includes a soldering-iron with means for reciprocating it over the can and for advancing and retracting it to and from work, and a cam-track for raising and lowering it as it is advanced and retracted. It includes means for automatically applying flux and other features of novelty hereinafter pointed out.

In the drawings, Figure 1 is a side view of part of my invention as applied to one form of machine in which the cans are carried by a rotary table. Fig. 1ᵃ is a detail sectional view of the soldering-iron and its flame-chamber with the jet-tube in place. Fig. 2 is a plan view of the soldering and fluxing mechanism as applied to the said machine. Fig. 3 is a detail of the cam-track for the soldering-iron. Fig. 4 is a similar view of the track for the fluxing-brush; and Fig. 5 is a detail view of the clutch device, the figure being a side elevation, partly in section. Fig. 5ᵃ is a sectional view across the end of the driving-shaft, showing the clutch-lever with the connection for operating the same and also its retracting-spring.

The machine shown, which is representative of any suitable can-carrier, has horns 1, upon which the cans are held by the clamps 2, controlled in any suitable manner. The soldering-iron 3 is carried in the forward end of an arm 3', which is pivoted to the slide 4, arranged to move in the ways 5, supported on the standard 6. The forward end of the arm has a socket in which the iron is carried, being held up by a pin 7. The iron carries attached thereto a flame chamber or case 7', into which a gas-jet is directed by the pipe 8, fed from a flexible tube or hose 9. When the iron is retracted, it is held up in the position shown in Fig. 1 by the roller 10 on its arm bearing on the upper side of the cam-track 11, which is supported by the standard. As the iron is advanced and reaches a position over the can, the roller on its arm runs down the incline 12 at the end of the cam-track, and the iron is thus allowed to fall gently upon the seam of the can. It contacts with the can at a point about three-quarters of an inch from the inner end thereof, and the solder, having been previously applied to the seam by the attendant or automatic feeding device, is melted by the iron. The iron continues its onward movement, spreading the solder to the inner end of the seam, and then it is moved out and in over the seam and then retracted to its extreme outward position. On this retracting movement the roller runs upon the lower cam-track 13, which has an incline at its outer end which lifts the iron to the position shown. For this action the upper cam-track has a spring portion 14, which rises, as shown in dotted lines, Fig. 3, in order to let the roller pass to the upper side of the track. The iron is now ready for another action. In its retracting movement the iron passes through the wiper box or pan 15, which is arranged in its path and contains a wiper-cloth moistened with a suitable liquid. This frees the iron from any solder and keeps the same clean. The slide, with the iron, is operated by the lever 16 and the cam 17 acting upon a roller on the lever. The cam has surfaces *a b c d e* to effect the movement of the iron in the order named. The lever is held in action by the spring 18. The soldering is done at the station X, Fig. 2, the table being turned in the direction indicated by the arrow and the cans being placed on the machine at the station Y by the attendant. At the intermediate station Z the flux is applied to the seam while the soldering and the placing of the new can are being done at the other stations. The flux is contained in a pan 19, arranged in the path of the brush 20, carried by the arm 21, pivoted to the slide 22, and operated in a manner similar to the soldering-iron from a cam 23 and a lever 24. This brush must dip into the flux-bath, and for this purpose the cam-track is formed with a depression x, which allows the brush-arm to, drop so that the same will get a supply of flux from the bath. This drop may be effected as the brush moves forward instead of backward, as shown. The cam for operating the brush is preferably arranged to work slightly in advance of the soldering-iron mechanism, so that it will perform its work and allow sufficient time for the attendant to place the solder on the flux before the table is given another movement and while the soldering-iron is completing its work. The soldering-iron and the flux mechanism operate periodically and are controlled by the attendant, who depresses a lever 25, extending laterally from a rock-shaft 26 in bearings 26ˣ, and through this rock-shaft and the rod 26ᵃ throws back the clutch-lever 26' and allows the clutch member 27 to engage the member 28 under the action of its spring 29, and then the cam is set in rotation, the clutch member 28 being revolved constantly by the pulley 30, running loose on the shaft 31, which carries the cam fixed thereto. The other clutch member is splined to the shaft. When set in motion, the parts make one rotation, the clutch being thrown out by the spur on the disk 45, connected with the member 27, engaging the clutch-lever. The clutch-lever is held by the spring 40 firmly in position, so that the clutch will be operated with certainty. One revolution of the cam is sufficient to make the soldering-iron complete the soldering of one can. The cam of the fluxing device is on the section 32 of the shaft, coupled to the other section by the universal joint 33, so that the operations follow each other in proper order.

In my patent, No. 425,296, dated April 8, 1890, I show automatic solder-feeding mechanism. It will be understood that I may use similar mechanism on the present machine, the solder being delivered downwardly through a feed-tube directed to the seam.

The soldering-iron is provided with a draft-opening 3' through it, so that the flame and heat will be drawn through to the rear side of the flame-chamber and the iron heated throughout. It will be noticed that the disk 45 is connected with the bar 27, having a beveled edge and forming one clutch member by the rod 46 extending axially through the end of the shaft 31, the said bar 27 projecting laterally through slots in the shaft. The clutch-lever 26' is pivoted at its lower end at 26ᵇ and the rod 26ᵃ connects with the lever at 26ᶜ.

I claim—

1. In combination in a soldering apparatus, the soldering iron, a reciprocating carrier therefor with operating means for the same in a direction longitudinally of the seam to and from its work and a cam track in the path of the reciprocating parts arranged to raise and lower the iron as it reciprocates to and from its work.

2. In combination in a soldering apparatus, the soldering iron and means for advancing and retracting the same toward and from its work, and mechanism arranged to reciprocate the iron when in its forward position the said advancing and retracting movements and the reciprocations taking place in a direction longitudinally of the seam.

3. In combination in a soldering apparatus, the soldering iron, means for advancing and retracting the same to and from its work, and arranged to reciprocate the iron when in its forward position and in line with the advancing and retracting movements, and the cam track for raising and lowering the iron, substantially as described.

4. In combination, the iron, means for advancing and retracting the same, and the cam track arranged to raise and lower the iron, said cam track having a yielding portion, substantially as described.

5. In combination in a soldering apparatus, the soldering iron, a reciprocating carrier with operating means therefor for advancing and retracting the iron in a direction longitudinally of the seam, a cam track in the path of the reciprocating parts arranged to raise and lower the same, said iron having a reciprocating movement along the seam when in its forward position, substantially as described.

6. In combination, the iron, means for reciprocating the same to and from its work and also for reciprocating the iron on the work and the wiper fixed in the path of the moving iron to clean the same, as the iron is retracted from the work substantially as described.

7. In combination, the iron, means for reciprocating the same, and moving it to and from its work, including a clutch with means for throwing the same automatically out of operation and operating means for throwing the clutch into operation, controlled by the operator, substantially as described.

8. In combination in a soldering machine, the soldering iron, the flux brush, means for reciprocating the same, the flux bath and the cam track in the path of the reciprocating parts carrying the flux brush for lowering and raising the brush to and from the bath and to and from the can, substantially as described.

9. In combination in a soldering apparatus, the means for advancing and retracting the iron to and from its work over the can, and into and out of the vertical plane of the can body and for reciprocating the iron when in engagement with the seam and means for raising and lowering the iron as it is advanced and retracted, substantially as described.

10. In combination in a soldering apparatus, the soldering mechanism, a flux brush, means for reciprocating the same to and from work and in a direction longitudinally of the seam and for giving the brush a to and fro motion along the seam when in contact therewith and means for raising and lowering the brush as it is retracted and advanced, substantially as described.

11. A reciprocating fluxing brush set upon a stand and a reciprocating soldering iron set upon an adjacent stand, said soldering iron being provided with means for advancing and retracting it and also for reciprocating it in its advanced position, in combination with a carrier arranged to bring the blanks successively into line with the fluxing and soldering tools, substantially as described.

In testimony whereof I affix my signature in presence of two witnesses.

WILLIAM DYER BROOKS.

Witnesses:
HENRY E. COOPER,
WALTER DONALDSON.